United States Patent [19]

Speraw

[11] Patent Number: 5,261,734
[45] Date of Patent: Nov. 16, 1993

[54] INTERNAL ELECTRONIC ENCLOSURE SYSTEM FOR EXTERNAL MONITORS (VIDEO)

[75] Inventor: Floyd G. Speraw, DeBary, Fla.

[73] Assignee: NCR Corporation, Dayton, Ohio

[21] Appl. No.: 504,527

[22] Filed: Apr. 4, 1990

[51] Int. Cl.⁵ ............................................. A47B 81/00
[52] U.S. Cl. ................................ 312/223.1; 312/257.1
[58] Field of Search ............. 312/263, 264, 352, 265.5, 312/223.1, 35.1, 257.1; 52/802, 793; 361/390

[56] References Cited

U.S. PATENT DOCUMENTS

| | | | |
|---|---|---|---|
| 3,012,835 | 12/1961 | Anderson et al. | 312/265.5 |
| 3,363,957 | 1/1968 | Basch | 312/214 |
| 4,089,464 | 5/1978 | Teti et al. | 312/264 |
| 4,120,545 | 10/1978 | Happak et al. | 312/7 R |
| 4,672,510 | 6/1987 | Castner | 361/415 |
| 4,712,843 | 12/1987 | Castelli et al. | 312/242 |
| 4,754,369 | 6/1988 | Nilsson | 361/390 |
| 4,757,665 | 7/1988 | Hardigg | 52/793 |

FOREIGN PATENT DOCUMENTS

| | | | |
|---|---|---|---|
| 0850628 | 9/1939 | France | 52/792 |
| 1446516 | 6/1966 | France | 52/792 |

Primary Examiner—Peter R. Brown
Assistant Examiner—Gerald A. Anderson
Attorney, Agent, or Firm—James M. Stover

[57] ABSTRACT

A low profile electronics cabinet for a computer workstation or personal computer formed of structural foam includes a plurality of ribs forming a support grid molded into the bottom, internal surface of the cabinet top and a plurality of vertical supports molded into the top, internal surface of the cabinet base. When assembled, the support grid rests upon the vertical supports, the support grid and vertical supports functioning to transfer the weight of a load placed on top of the cabinet to the cabinet base.

10 Claims, 8 Drawing Sheets

INTERNAL ELECTRONIC ENCLOSURE SYSTEM FOR EXTERNAL MONITORS (VIDEO)

The present invention relates to a housing or cabinet for electrical or electronic equipment and, more particularly, to an electronics cabinet formed of structural foam including structure for supporting externally mounted loads.

BACKGROUND OF THE INVENTION

The shape and design of cabinets for housing the electrical and electronic components of personal computers and computer terminals is becoming more compact and lightweight as the internal components are similarly reduced in number, size and weight. In addition, esthetic and cost considerations are becoming of greater importance in the design and manufacture of computer cabinetry as competition in the sale of personal computers and computer workstations continues to intensify.

Today's typical personal computer or computer workstation comprises the following three components: a cabinet which houses the logic electronics, a detachable keyboard and a monitor. The workstation or personal computer may also include a printer, disk drives, memory, interface logic, modems and other peripheral devices, many of which may also be housed in the electronics cabinet. An electronics cabinet having a low profile and small footprint and which is lightweight offers many advantages over past cabinet designs. A cabinet of such design permits easy set up and transportability, and can easily be positioned on a desktop. The low profile allows mounting of the monitor on top of the cabinet eliminating the requirement of additional desk space, or the need for a large vertical extent to accommodate the monitor. All of the major workstation components can therefore be conveniently located in close proximity to the user.

For both functional and esthetic reasons, it is desirable to mold the electronic cabinet out of plastic. However, this presents a problem in that the top of the cabinet may not by capable of adequately supporting the weight of a monitor or other equipment placed on top of the cabinet. Monitors typically have a weight in the range of twenty-five to one hundred pounds. The distributed load of the monitor load can easily exceed the bending strength of the cabinetry thus creating a sag in the cabinet top, endangering the enclosed electronics and providing a wobbly condition for video viewing.

Objects of the Invention

It is therefore an object of the present invention to provide a new and improved electronics cabinet which includes structure for supporting loads placed upon the cabinet top.

It is another object of the present invention to provide such a cabinet molded from structural foam and capable of supporting the weight of a video monitor or other electronic equipment with negligible deflection or sag of the cabinet top.

It is yet another object of the present invention to provide a cabinet formed of structural foam which includes structure for transferring the weight of a load placed on the cabinet top to the cabinet base.

Summary of the Invention

There is provided, in accordance with the present invention, a cabinet comprising a cabinet top having top and bottom planar surfaces and including a plurality of ribs formed into the bottom surface of the cabinet top; and a cabinet case having top and bottom planar surfaces and including a plurality of vertical supports attached to the top surface of the base; whereby the plurality of ribs are supported by the vertical supports when the cabinet top is placed onto the base, the ribs and vertical supports functioning to transfer the weight of a load placed upon the cabinet top to the cabinet base.

In the described embodiment, the ribs form a support grid and are molded into the bottom surface of the cabinet top. The vertical supports are molded into the top surface of the cabinet base and are positioned such that a support is provided to each intersection of ribs which form the support grid. The cabinet top including ribs and the base including vertical supports are formed of structural foam, such as GE Noryl FN150, GE Lexan FL400, or the like.

The above objects and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

Figure 1:
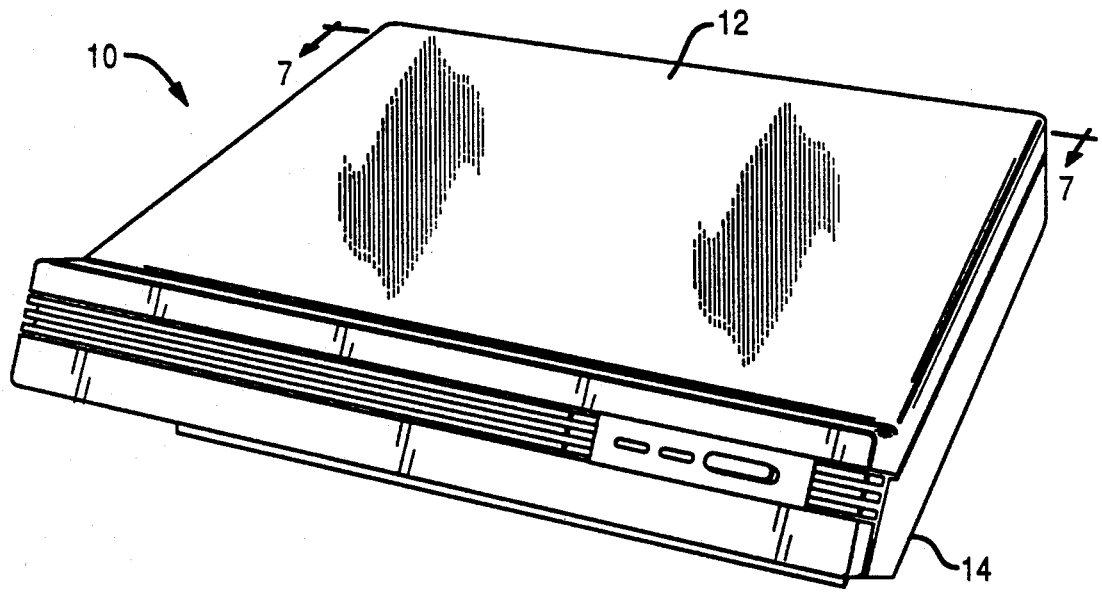
FIG. 1 is a perspective view of a low profile electronics cabinet for a computer workstation.
Figure 2:
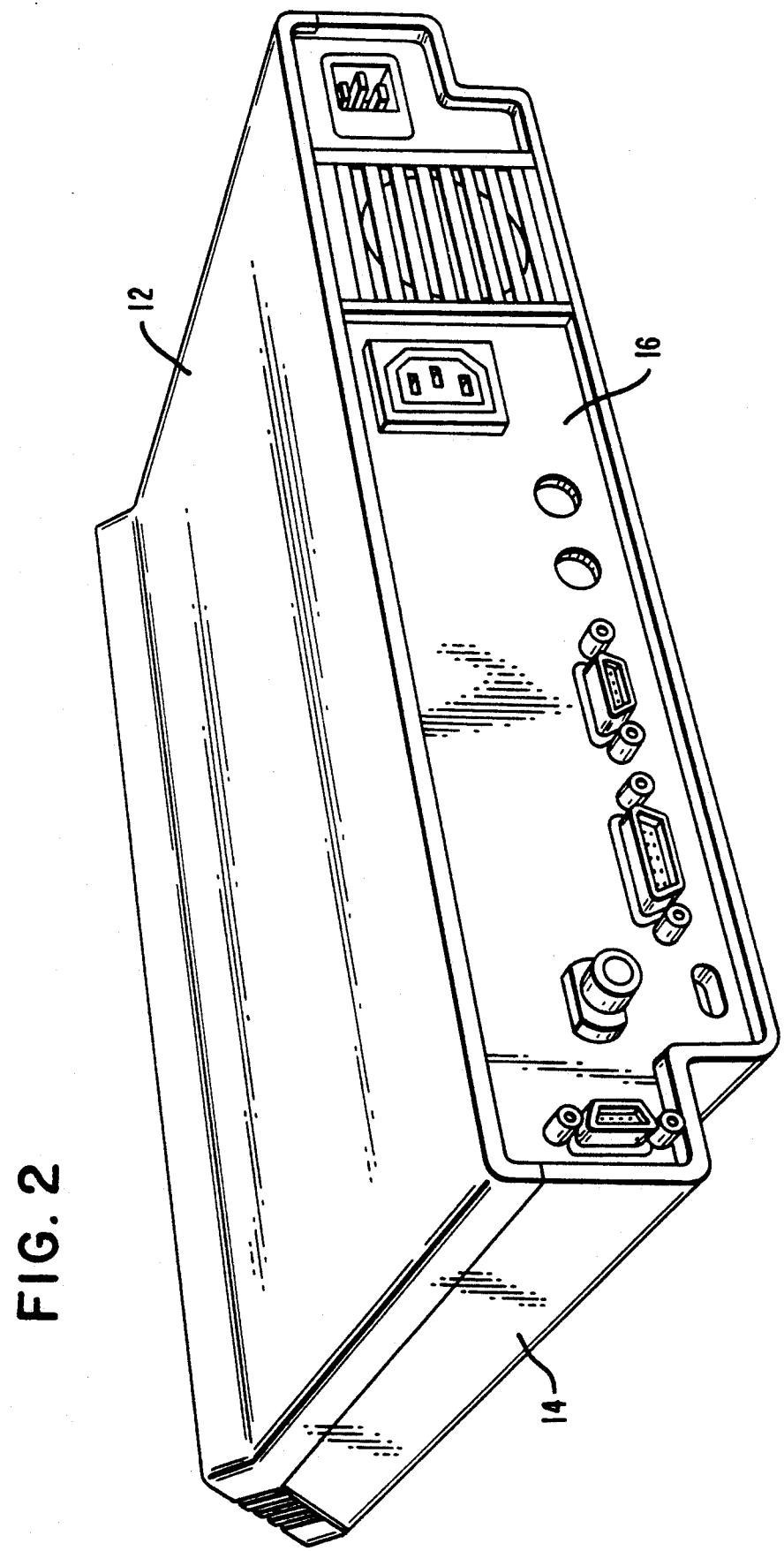
FIG. 2 is a perspective view of the back of the cabinet of FIG. 1.
Figure 3:
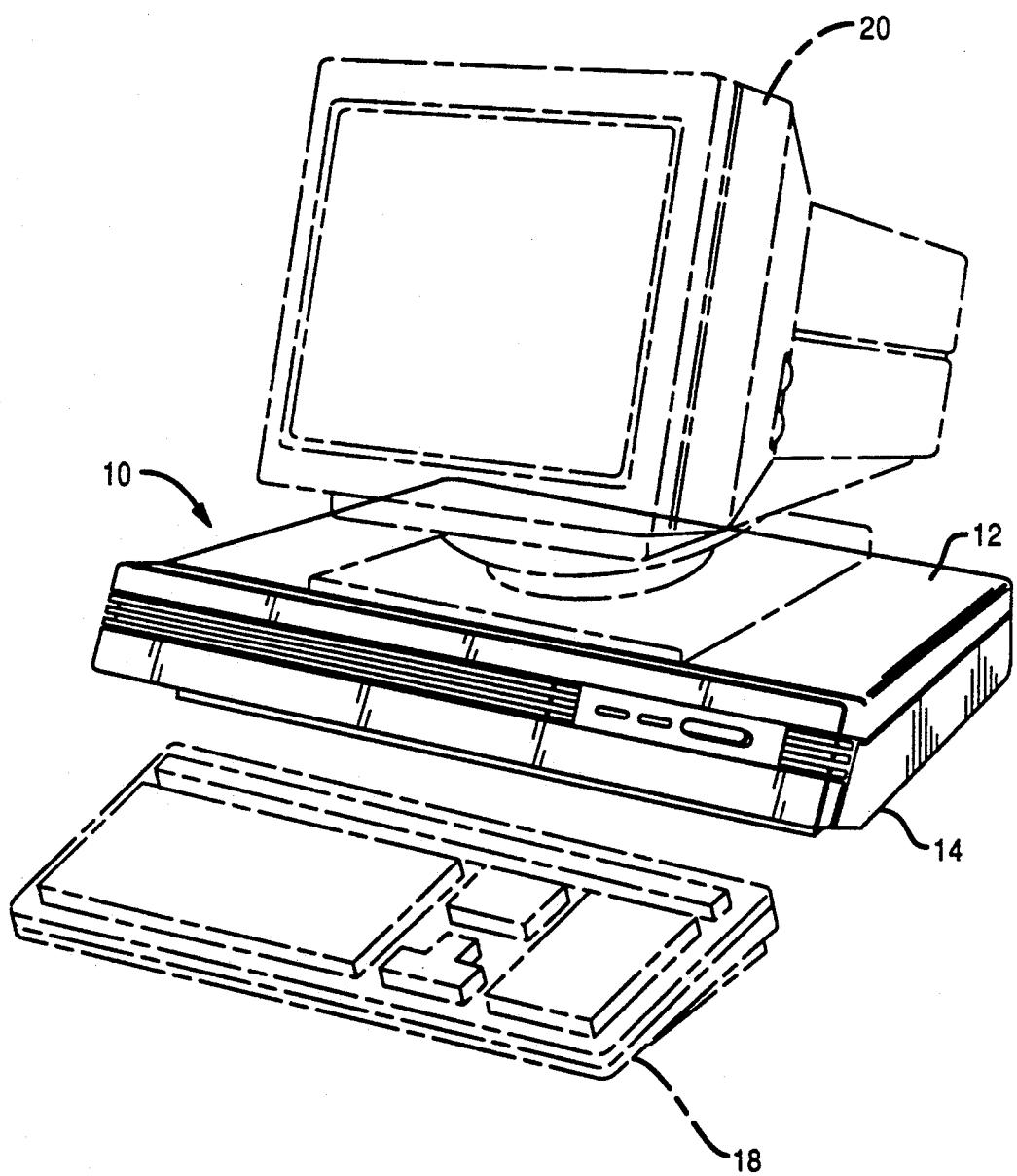
FIG. 3 is a perspective view of the cabinet of FIG. 1 shown with a computer keyboard and video monitor.

Referring now to FIGS. 1 and 2, there are seen front and rear perspective views of a low profile electronics cabinet 10 for a computer workstation. The cabinet includes a cabinet top 12 and base 14 which are molded from structural foam, such as GE NorylR FN150. A metal plate 16 including interface and power connections forms the back side of the cabinet. The workstation would also necessarily include a keyboard 18 and a video monitor 20, as illustrated in phantom in FIG. 3. In FIG. 3, the workstation components are shown arranged in their contemplated configuration, with monitor 20 supported by cabinet top 12.

Figure 4:
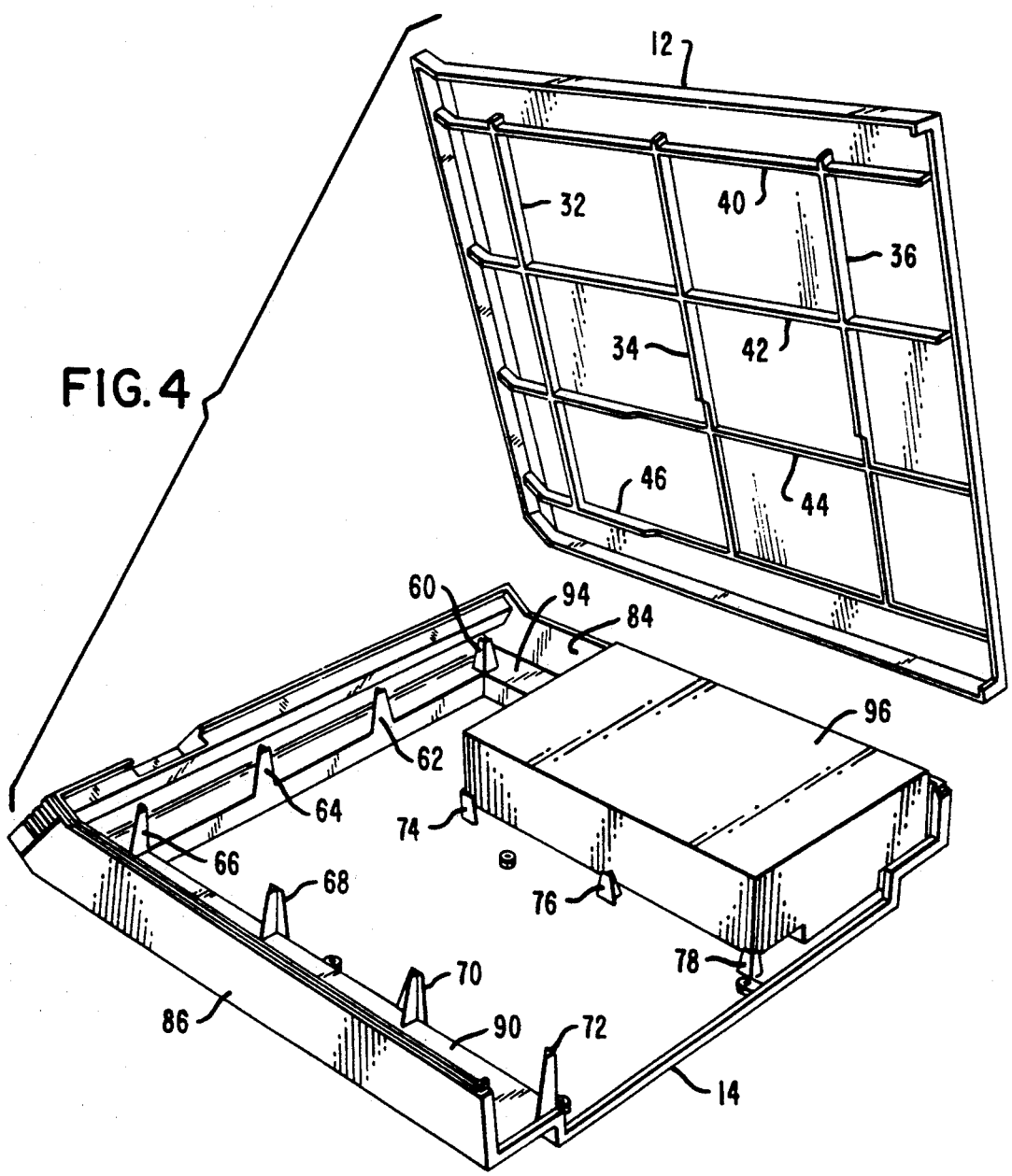
FIG. 4 is a perspective view of the cabinet of FIG. 1 shown with the top removed from the cabinet illustrating one embodiment of the present invention.

FIG. 4 is a perspective view of cabinet 10, shown with cabinet top 12 removed from base 14. The internal surfaces of the cabinet top and base, which include structure for supporting the video monitor, are illustrated. The internal surface of cabinet top 12 is primarily planar with the inclusion of a plurality of ribs 32, 34, 36, 40, 42, 44 and 46, to be described in greater detail below.

Figure 5:
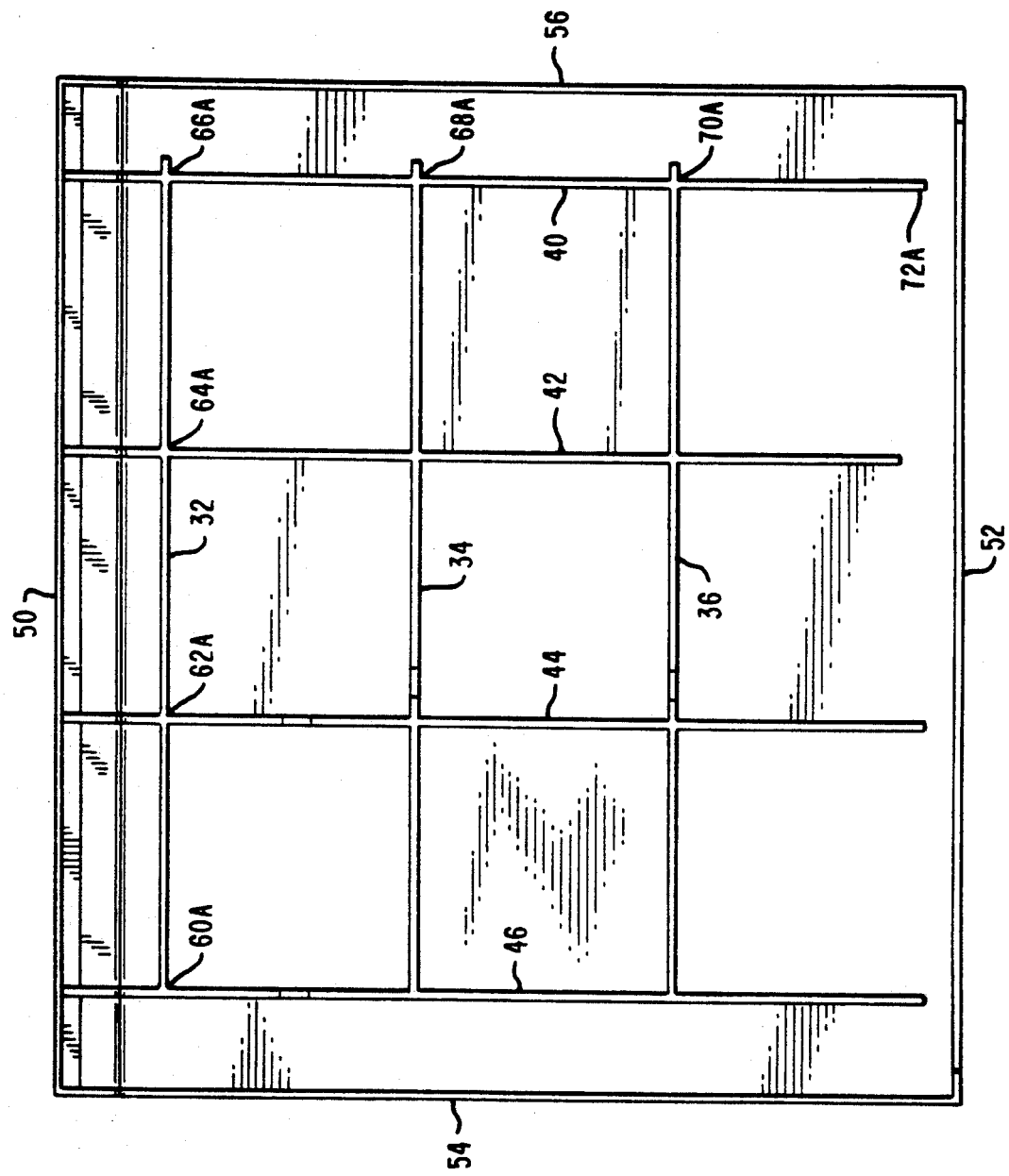
FIG. 5 is a plan view of the interior surface of the cabinet top shown in FIG. 4.

FIG. 5 provides a plan view of the interior, or bottom, surface of cabinet top 12. Ribs 32, 34 and 36 are disposed in parallel with the front and rear edges, 50 and 52, respectively, of the rectangular cabinet top. Ribs 40, 42, 44 and 46 are parallel with the side edges, 54 and 56, of the cabinet top. The intersecting rib structure, which is integral with the cabinet top, forms a grid which provides support to the cabinet top.

Figure 6:
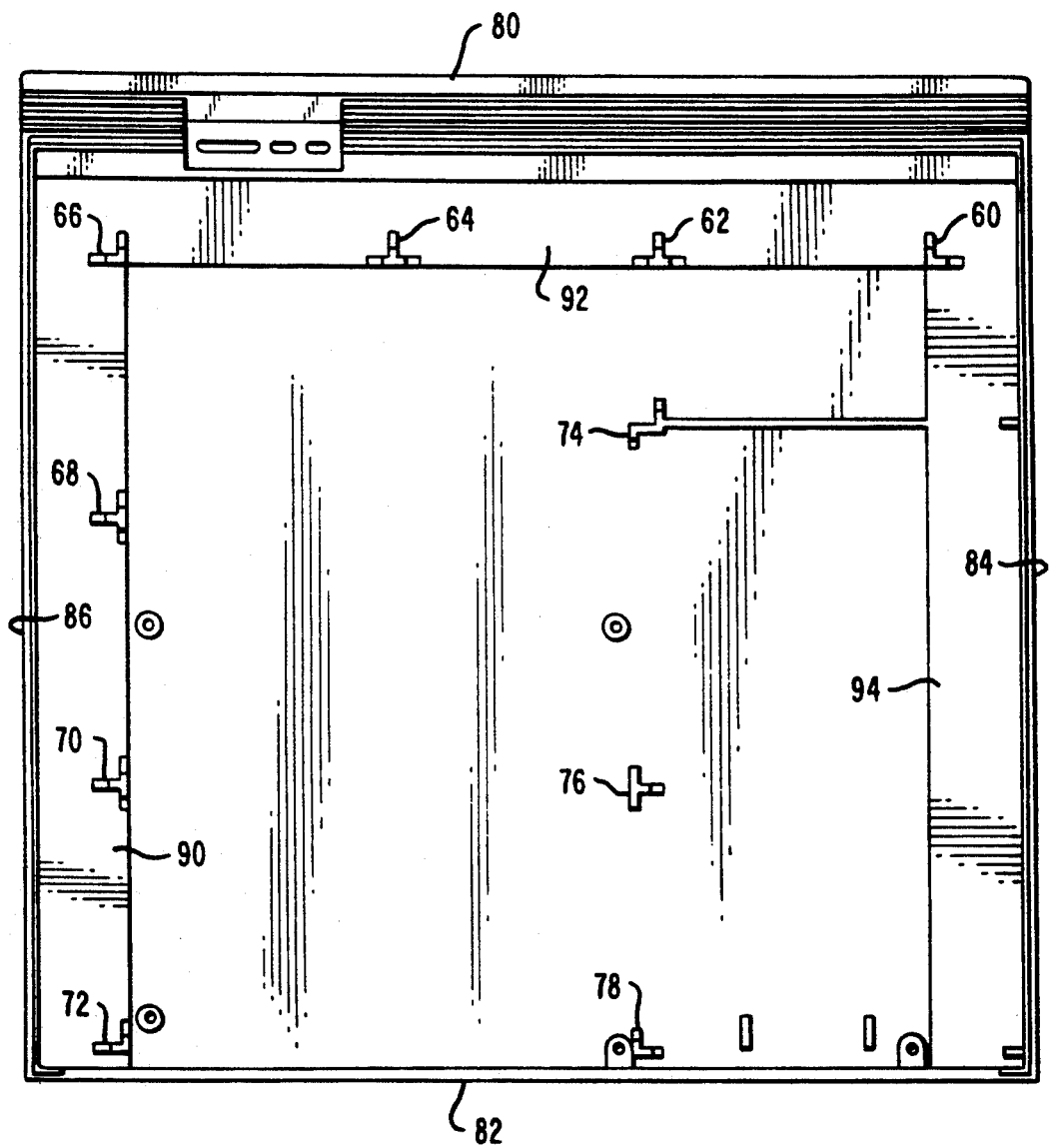
FIG. 6 is a plan view of the interior surface of the cabinet base shown in FIG. 4.

FIG. 6 shows a plan view of the interior surface of cabinet base 14. Viewing FIGS. 4 and 6, it is seen that the interior surface of base 14 is also rectangular and planar and includes a plurality of vertical support structures 60, 62, 64, 66, 68, 70, 72, 74, 76 and 78. As constructed, base 14 also includes cabinet side walls 84 and 86, cabinet front 80, and side and front shelves 90, 92 and 94.

Vertical supports 60, 62, 64, 66, 68, 70 and 72 are formed to have sufficient vertical dimension so that when cabinet top 12 is installed over base 14 contact is made between the top of each support and the bottom of the grid formed by ribs 32, 34, 36, 40, 42, 44 and 46. The grid points identified by reference numerals 60A, 62A, 64A, 66A, 68A, 70A and 72A (FIG. 5) are points of contact for vertical supports 60, 62, 64, 66, 68, 70 and 72, respectively. The identified contact points are seen to be located at rib intersections. Vertical supports 74, 76 and 78 are much shorter than supports 60 through 72, the top of each of supports 74, 76 and 78 being coplanar with the top surface of shelf 94. These shorter supports together with shelf 94 provide support for power supply 96, the top surface of which shoulders a portion of ribs 34, 36, 44 and 46.

Figure 7:
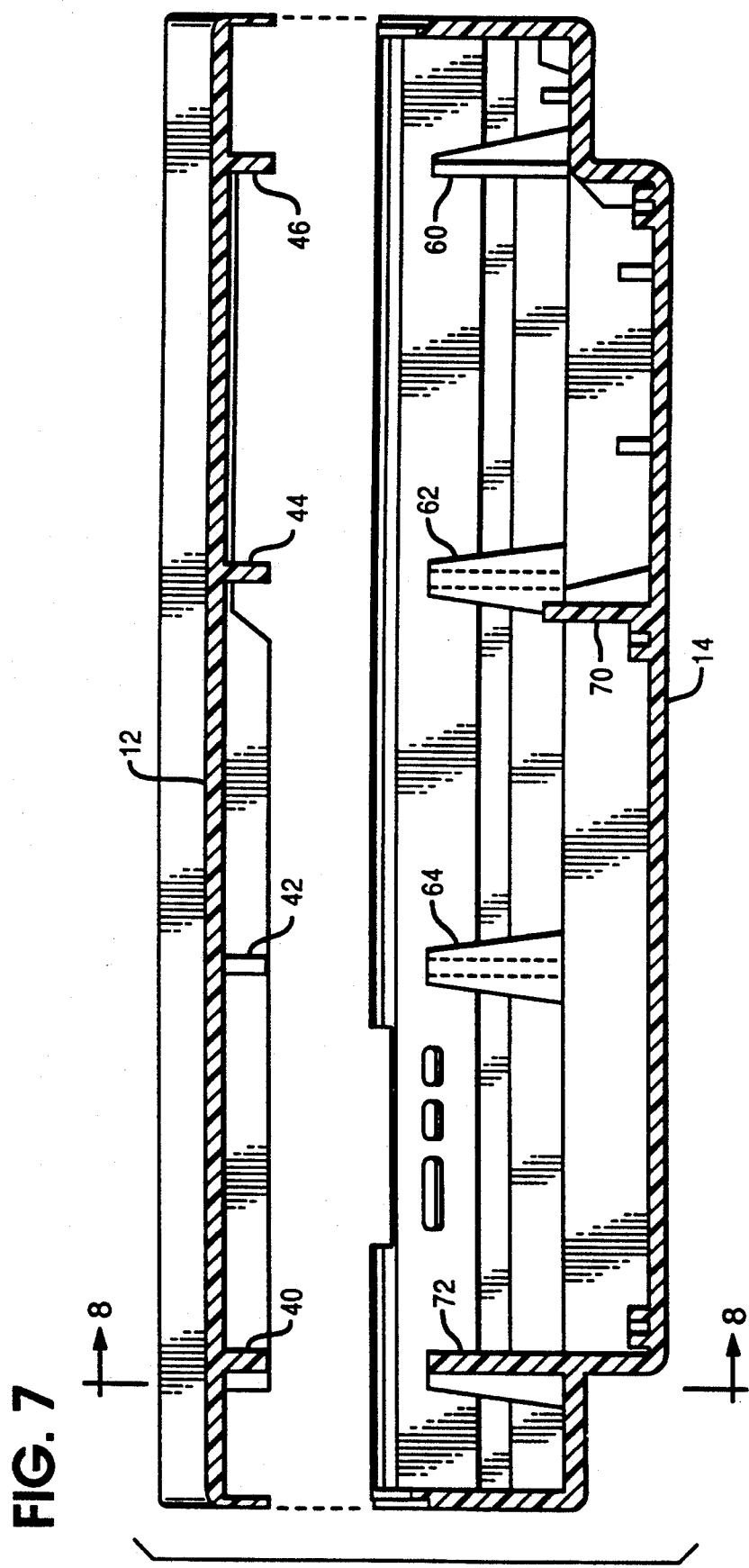
FIG. 7 is an elevation view of the cabinet top and base taken along lines 7—7 of FIG. 1.
Figure 8:
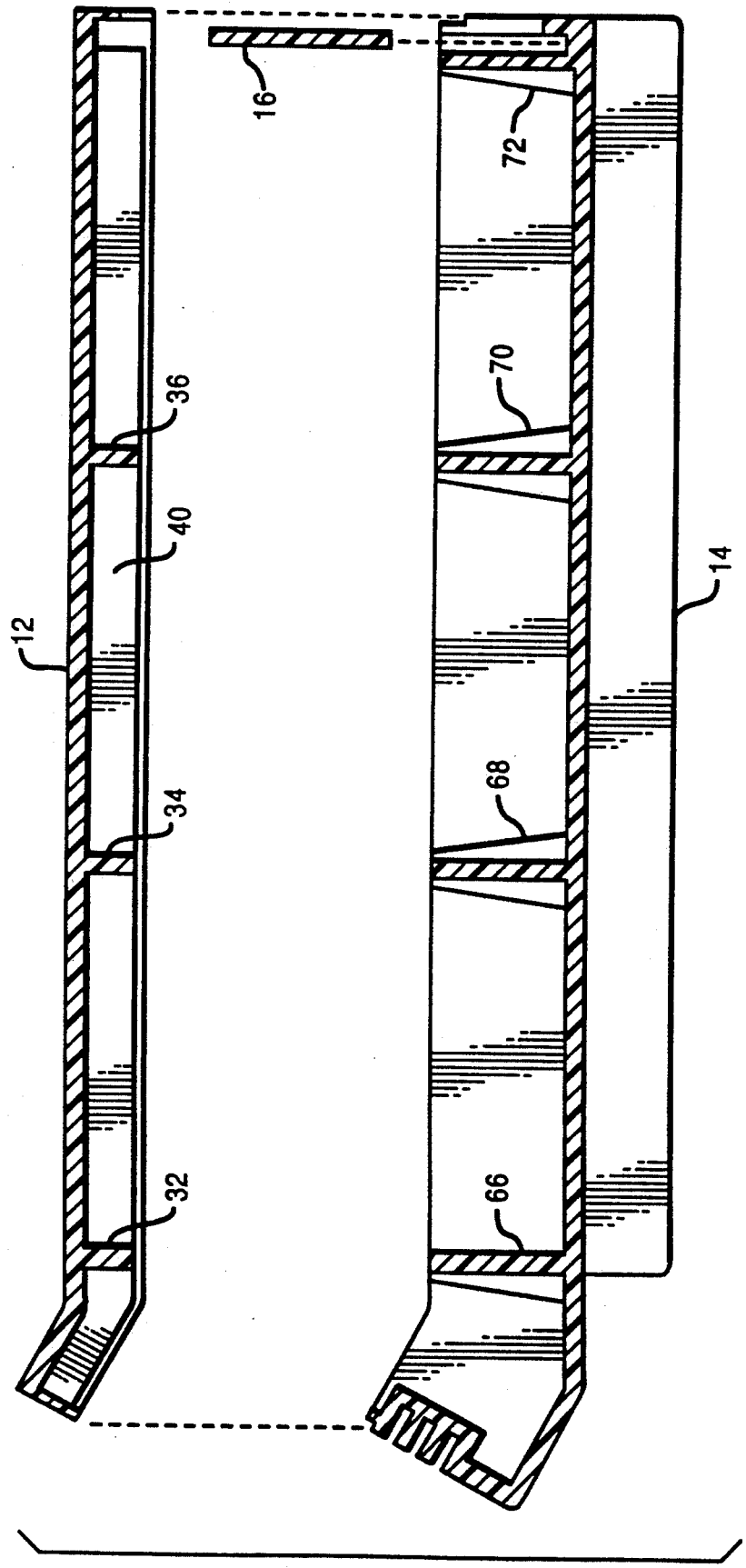
FIG. 8 is an elevation view of the cabinet top and base taken along lines 8—8 of FIG. 7.

FIGS. 7 and 8 are elevation views of the cabinet top and base taken along lines 7—7 of FIG. 1 and lines 8—8 of FIG. 7, respectively. These two figures further illustrate the interaction between the system of ribs molded into cabinet top 12 and the vertical supports rising from base 14.

As stated above, the cabinet top including ribs is molded in one piece of structural foam such as GE NorylR FN150. Likewise, the cabinet base including the vertical supports is molded in one piece of structural foam.

With cabinet top 12 installed over base 14, the invention as set forth above operates as described below to support the load of a monitor or other piece of equipment placed upon the top of the cabinet.

The weight of a monitor or other equipment placed upon the top of the cabinet is distributed horizontally through the gridwork of ribs to the vertical supports, the top of power supply 96, and to rear plate 16. Through the vertical supports, the frame of the power supply and the rear plate the load is transferred to the cabinet base which is supported by a desk or table top.

It can thus be seen that there has been provided by the present invention an electronics cabinet capable of supporting the weight of a video monitor or other electronic equipment with negligible deflection or sag of the cabinet top, thereby providing protection for the electronics housed in the cabinet and a secure, wobble-free surface for placement of the video monitor or other equipment. The internal support structure described is integral with the cabinet top and base, lightweight and inexpensive to construct. Additional support structure, such as metal cladding of interior cabinet surfaces or metal framing, is not required to strengthen the cabinet.

Although the presently preferred embodiment of the invention has been described, it will be understood that various changes may be made within the scope of the appended claims. The number, arrangement and spacing of ribs and vertical supports may be varied to accommodate different cabinet designs, functions and sizes and anticipated loads. In the embodiment of the invention described above, power supply 96 is supported by vertical supports 74, 76 and 78. These three vertical supports can be extended to have the same vertical dimension as supports 60 through 72, thereby removing load bearing requirements from the power supply frame, permitting use of a smaller power supply or removal of the supply from the cabinet.

In addition to the modifications discussed above, some or all of the vertical supports may be formed as a part of the cabinet top rather than the cabinet base. Also, the support grid, formed of the ribs, need not be an integral, molded part of the cabinet top but could be a separate cabinet piece supported by the vertical supports and upon which the cabinet top is placed.

Those skilled in the art will recognize that the invention is not limited to the specific embodiments described and illustrated. Other variations, changes, substitutions and equivalents are possible without departing from the spirit and scope of the present invention. Accordingly, it is intended that the invention to be secured by letters patent be limited only by the scope of the appended claims.

What is claimed is:

1. An electronics cabinet comprising:
   a cabinet top including a top wall having a plurality of ribs formed into the bottom surface of said top wall; and
   a cabinet base including a bottom wall having a plurality of vertical supports attached to the top surface of said bottom wall;
   whereby said plurality of ribs are supported by said vertical supports when said cabinet top is placed onto said cabinet base; and
   whereby said top wall and said bottom wall define a cavity for housing electronic components when said cabinet top is placed onto said cabinet base.

2. The cabinet according to claim 1, wherein said plurality of ribs includes a first set of ribs orientated in a first direction and a second set of ribs orientated in a second direction.

3. The cabinet according to claim 2, wherein said second direction is orthogonal to said first direction, said first and second sets of ribs forming a support grid.

4. The cabinet according to claim 3, wherein a vertical support is located below each intersection of a rib belonging to said first set and a rib belonging to said second set.

5. The cabinet according to claim 1, wherein said cabinet top and said base are formed from structural foam.

6. An electronic cabinet comprising:
   a cabinet top comprising a top wall having a plurality of ribs formed into the bottom surface of said top wall;
   a cabinet base comprising a bottom wall; and
   a plurality of vertical supports disposed between said plurality of ribs and the top surface of said bottom wall;

whereby said plurality of ribs are supported by said vertical supports, said ribs and vertical supports functioning to transfer the weight of a load placed upon said cabinet top to said cabinet base; and whereby said top wall and said bottom wall define a cavity for housing electronic components when said cabinet top is placed onto said cabinet base.

7. The cabinet according to claim 6, wherein said vertical supports are integral with said base.

8. A low profile electronics cabinet for supporting externally mounted equipment, said cabinet comprising:

a cabinet top having a rectangular top wall including front, rear and side edges;

a base portion having a rectangular bottom wall, front and side edge walls, and a rear edge; and a rear plate;

whereby said cabinet is formed by installing said cabinet top over said base, said front and side edges engaging said front and side edge walls, said rear plate being positionable between the rear edges of said cabinet top and base to form he rear wall of said cabinet;

said top wall includes a first plurality of ribs formed into the bottom surface of said top wall parallel with said front and rear edges, and a second plurality of ribs formed into the bottom surface of said top wall parallel to with said side edges, said first and second plurality of ribs forming a support grid;

said base includes a first plurality of vertical supports formed into the top surface of said bottom wall, a support being located below each intersection of a rib belonging to said first plurality of ribs and a rib belonging to said second plurality of ribs; and said first and second plurality of ribs are supported by said first plurality of vertical supports when said cabinet top is placed onto said base.

9. The cabinet according to claim 8, and further comprising:

a power supply housed in said cabinet, said power supply having top and bottom planar surfaces; and a second plurality of vertical supports formed into the top surface of said bottom wall;

whereby said second set of vertical supports supports the bottom surface of said power supply and the top surface of said power supply supports said grid.

10. The cabinet according to claim 9, wherein said cabinet top and ribs and said base and vertical supports are formed of structural foam.

* * * * *